Aug. 10, 1937.  E. J. DONDLINGER  2,089,347
TRANSPORT VEHICLE FOR POWDERED COAL AND THE LIKE
Filed March 9, 1936  3 Sheets-Sheet 2
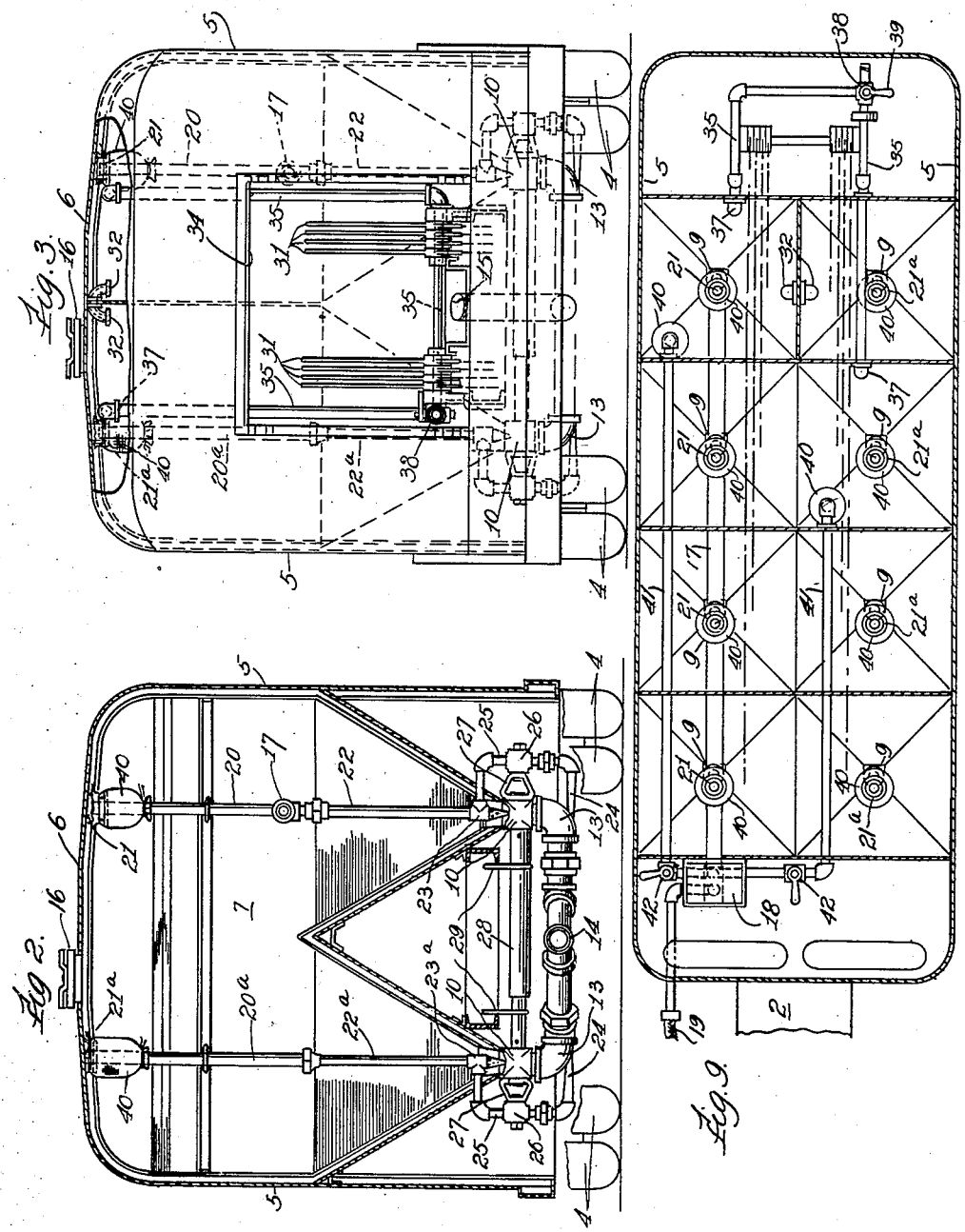
Inventor.
Eugene J. Dondlinger
by
his Attorneys.

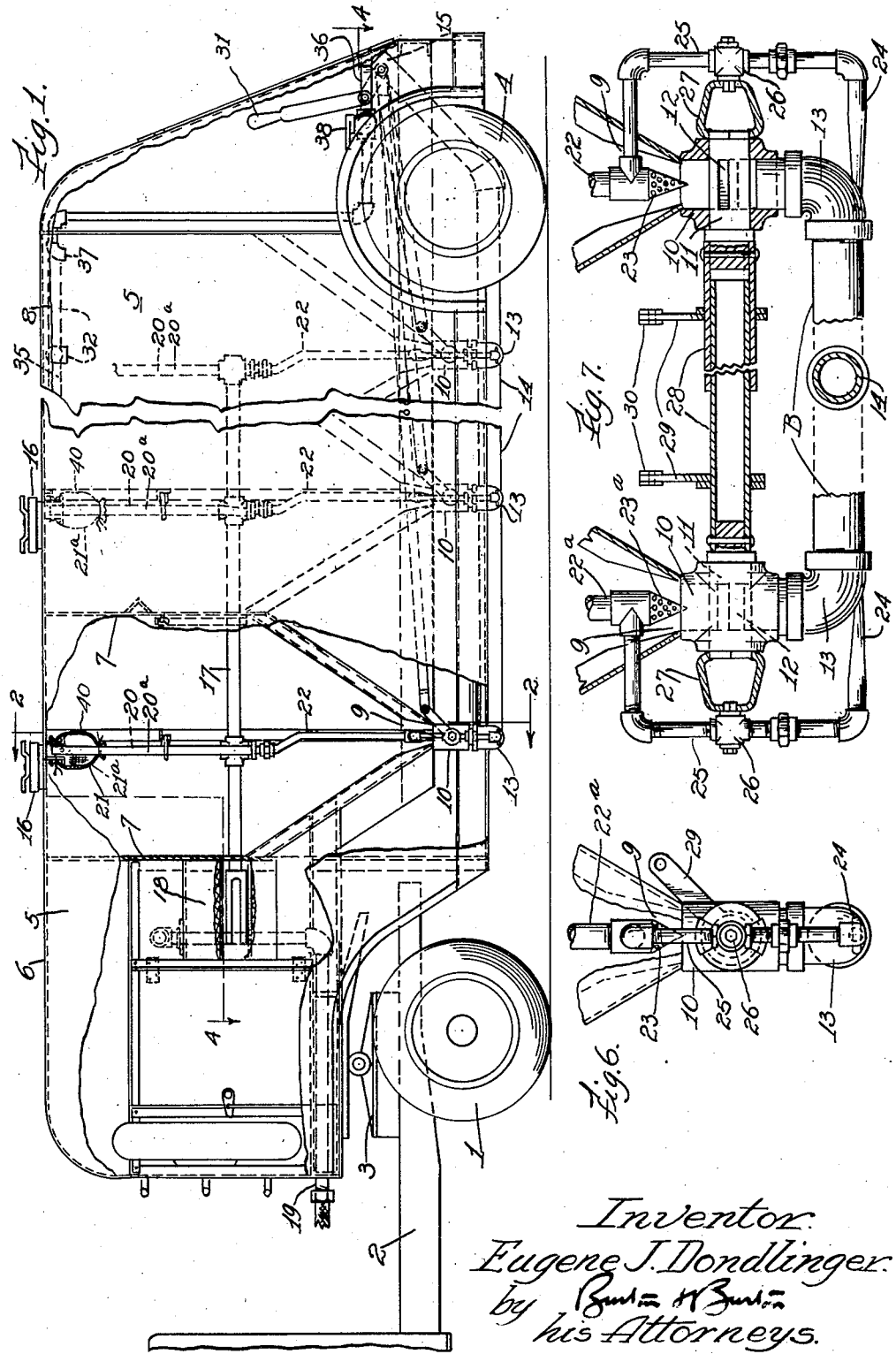

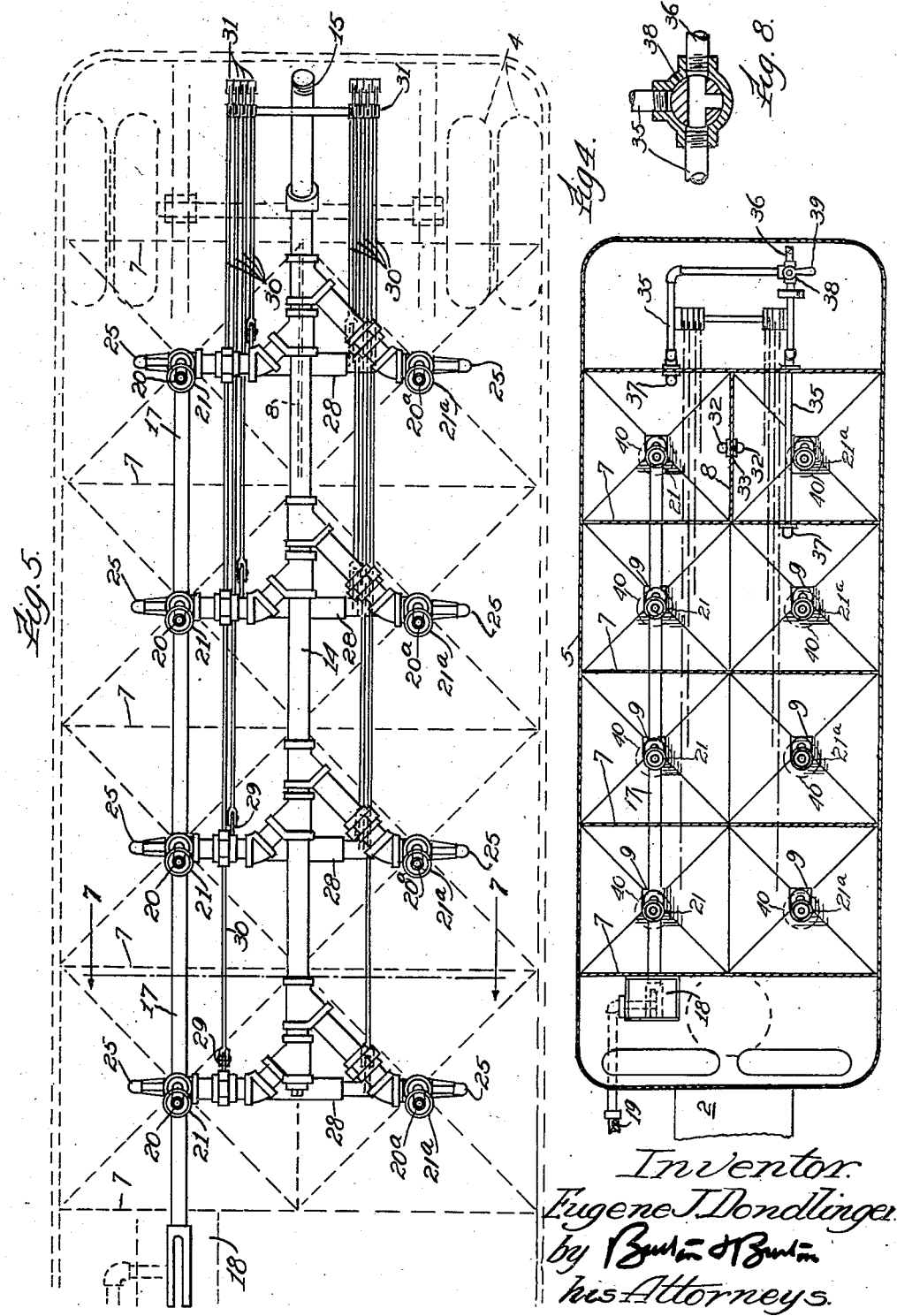

Patented Aug. 10, 1937

2,089,347

UNITED STATES PATENT OFFICE 2,089,347

TRANSPORT VEHICLE FOR POWDERED COAL AND THE LIKE

Eugene J. Dondlinger, Chicago, Ill.

Application March 9, 1936, Serial No. 67,755

9 Claims. (Cl. 214—83)

This invention relates to means for transporting pulverized materials, and for delivering and loading them. For purposes of illustration I have shown a vehicle particularly designed for handling powdered coal, and including apparatus adapting it for also handling the ash which results from burning this fuel. One object of the invention is to provide a carrier in which pulverized material is transported in completely closed compartments; another object is to provide means for discharging the material by the use of compressed air, and also facilitating the flow of the material by the introduction of air at critical points in the delivery line. A further object is to provide means for reversing the flow of air to adapt the apparatus for loading the vehicle with pulverized material. Other objects will appear as the description proceeds. The invention thus consists in various features and elements of construction in combination as herein shown in the drawings and as indicated by the claims.

In the drawings:

Figure 1 is in the nature of a side elevation of a transport vehicle embodying this invention, with a portion broken out to condense the view, and with certain parts of the side walls broken away to reveal interior features of construction.

Figure 2 is a transverse sectional view taken as indicated at line 2—2 on Figure 1.

Figure 3 is a rear elevation of the vehicle with certain parts broken away.

Figure 4 is a plan section of the vehicle taken as indicated at line 4—4 on Figure 1.

Figure 5 is also a plan section, taken below the material-holding compartments of the body, for showing the arrangement of pipes constituting the discharge and delivery conduits.

Figure 6 is a detail elevation of one of the discharge valves with associated piping.

Figure 7 is an elevation taken as a transverse section substantially at the line 7—7 on Figure 5.

Figure 8 is a detail section of a control valve for directing the flow of material.

Figure 9 is a plan section similar to Figure 4, showing a modified arrangement for applying suction to certain compartments.

For purposes of illustration this invention is shown embodied in a vehicle of the trailer type, indicated as a semi-trailer, connected to a motor truck, of which the rear wheels are shown diagrammatically at 1, associated with a frame, 2, and articulated coupling in the nature of a fifth wheel, 3, supporting the front end of the trailer body. The rear end of the trailer is carried on road wheels, 4, and the body is of the closed type, having sheet metal side walls, 5, and top, 6, presenting a smooth and pleasing exterior contour. This vehicle body is sub-divided into several compartments by vertical partitions, 7 and 8. As shown, most of the compartments which are separated by the partitions, 7, extend across the body through its entire width, but each of these wide compartments is formed with a hopper bottom having two outlets, 9, to which its sloping walls lead for delivery of the material. As shown, near the rear of the body its width is divided into two compartments by the longitudinal partition, 8, and it may be understood that any desired distribution of these smaller and larger compartments may be arranged to suit the requirements of the particular material which is to be handled.

The hopper formation at each of the outlets, 9, is connected to a discharge conduit, 10, leading vertically downward, and containing a valve, 11, whose port, 12, may be shifted to open the passageway through the discharge conduit, 10, or to close it, by rotation of the valve member. Below the valve fitting the conduit includes an elbow, 13, and a short, horizontal branch obliquely connected into a common delivery pipe, 14, which extends longitudinally under the vehicle body and terminates at the rear in an outlet, 15, threaded for attachment of a flexible hose or other suitable piping for conveying the material to the point of use or to a storage bin, when it is discharged from the vehicle. The top wall, 6, of the body is provided with reasonably large filler openings over each compartment, and these are closed air-tight by removable covers, 16.

To assist and ensure the discharge of the pulverized material, such as pulverized coal, from the hoppers, I provide an air supply pipe, 17, arranged for connection at the forward end of the vehicle with any suitable air-compressing apparatus (not shown) which may be carried either on the motor truck or in the trailer itself, but which may be conveniently mounted on the truck and driven by the truck engine through a disengageable clutch connection in a well-understood manner. Preferably, the air supply leads through an air filter, 18, to ensure that the air which is to become mixed with the pulverized coal shall be reasonably clean, and especially clear of undesirable solid particles. The supply connection leading into the filter, 18, is shown at 19 on Figure 4. The supply pipe, 17, extends through the several storage compartments and in each one it is connected to a riser, 20, discharging upwardly under a cap or hood, 21, just below the top, 6, of the body. A second vertical pipe, 22, leads downwardly from the supply pipe, 17, to a discharge nozzle, 23, located adjacent the outlet 9, for blowing compressed air into the discharge conduit, 10, to facilitate the outflow of the pulverized material through this outlet. The air pressure is thus simultaneously applied to the material from above through the riser, 20, and to the out-flowing material through the nozzle, 23. Since the material, upon passing the valve, 11, must flow around the elbow, 13, I provide an auxiliary nozzle, 24, opening into the lower portion of the elbow and discharging directly toward the horizontal branch. This nozzle, 24, is connected by a branch pipe, 25, with the air pipe, 22,—the connection preferably leading out of the fitting which includes the nozzle, 23, as seen in Figure 7. An air valve, 26, included in the branch, 25, is arranged with the axis of its valve member substantially aligned with the axis of the valve member, 12, and said valve members are connected mechanically by a coupling yoke, 27, so that the air valve, 26, is opened simultaneously with the valve, 12, to ensure a supply of air at the nozzle, 24, as soon as the material begins to flow through the discharge pipe.

A tubular rock shaft, 28, is secured to the stem of the valve, 12, and a rocker arm, 29, rigid thereon, together with a link, 30, form the operating connection to a hand lever, 31, at the rear of the vehicle, so that from this position the valve, 12, and its auxiliary air valve, 26, may be opened or closed at will, thus directing the flow of material from any chosen hopper or compartment into the delivery pipe, 14. The bank of levers, 31, at the rear may include separate operating means for each of the valves, 12, and in this case the tubular rock shafts, 28, corresponding to each pair of transversely aligned valves, may be telescoped with each other, as seen in Figure 7; however, if desired, a single rock shaft may connect the two valves of the pair when these valves both lead from a single compartment.

With the arrangement shown I connect the supply pipe, 17, directly to only one of the risers, and one of the outlet nozzles in the larger type of compartment having two discharge outlets, 9. The second outlet has associated with it a vertical pipe, 20ª, leading to an outlet under a hood, 21ª, just under the top, 6, and a downwardly leading portion, 22ª, provided with a discharge nozzle, 23ª, which is exactly similar to the nozzle, 23, already described, and has connection with a branch air pipe, 25, leading to a horizontal nozzle, 24, and controlled by a valve, 26. However, since the entire compartment is placed under air pressure through the outlet under the hood, 21, this pressure will extend into the hood, 21ª, and through the pipe, 20ª, 22ª, so that the air will be discharged at either nozzle, 23, or nozzle, 23ª, or at both of these nozzles simultaneously, depending upon the opening of the discharge valves, 12. Where the compartments are divided by a partition, 8, the pressure in one compartment may be applied simultaneously to that in the adjacent compartment by means of a connection in the partition, 8, which is shown as consisting of a pair of downwardly turned elbows, 32, connected by a short nipple, 33, which passes through the partition, 8.

Thus, with several compartments each containing a unit load of the pulverized fuel, deliveries may be made to several small users, as in the case of residence heating plants, successively on a single trip. Each compartment may be discharged independently of the others at will simply by applying the air pressure to the line, 17, and opening the proper discharge valve or valves, 12. The control levers, 31, for the valves are all housed in a small compartment at the rear, which may be provided with a suitable door or doors at the opening, 34, for enclosing the levers to prevent tampering by unauthorized persons.

As shown, I have provided filler pipes, 35, discharging into the upper portions of certain of the compartments and leading from a common inlet connection, 36, for filling one or more of these compartments with pulverized material which can be picked up by suction. This may be accomplished very simply by reversing the flow of air in the trunk pipe, 17, as for example, by reversing the direction of rotation or the pipe connections of a rotary fan or blower, not shown, which may be understood as associated with this pipe and mounted either on the truck or on the trailer vehicle. Suction being thus applied, all compartments will be placed under partial vacuum. The inlet, 36, is connected by a flexible pipe or hose, with the ash pit or bin containing such material, and it is thus sucked into one of the pipes, 35, and discharged through the downwardly opening elbow, 37, which serves as a terminal.

The drawings show a three-way valve, 38, with an operating handle, 39, by which it may be adjusted to feed the incoming material into either one of two pipes, 35, connected to the valve fitting, one of them discharging into a full-width compartment and the other into a half-width compartment. The compartment having been emptied of a load of pulverized coal may be thus utilized for picking up the ashes at the same address so that the use of the vehicle provides the customer with a complete fuel service in connection with a heating plant adapted for this type of fuel. When this method of securing suction in certain compartments is contemplated, there is a possibility of drawing a considerable quantity of dust into the air trunk pipe, 17, particularly from compartments which have been already used to carry ashes; to prevent the entrance of dust into this line the hoods, 21 and 21ª, may include filter jackets, 40, of sufficiently close weave to exclude the dust and thus prevent it from being carried into the compartments containing coal.

Preferably, separate suction trunk pipes, 41, may be provided leading from the filter, 18, to those compartments which are furnished with inlets, 37. A separate valve 42 in each of the pipes, 41, will permit suction to be applied selectively to any compartment which is arranged to receive material from the inlet, 36, and without altering the pressure conditions in the other compartments, some of which may still contain coal at the time when the suction is to be utilized for loading ashes. With this arrangement the filter, 18, protects the pump or blower from any dust which may be picked up by the suction, but, in addition, inlets of pipes, 41, may be covered with filter jackets, 40, if desired. This modified arrangement is illustrated in Figure 9.

I claim:
1. In a transport vehicle for pulverized material, a compartment having an outlet at the bottom, a discharge conduit leading from said outlet, a discharge valve for closing the outlet, said conduit including an elbow and a horizontally extending portion leading therefrom, and an air supply pipe connected to a nozzle discharging into the discharge conduit adjacent to said outlet, said air supply pipe communicating with a second nozzle discharging into the elbow in the direction of movement of material therethrough for assisting the outflow of material from the compartment when the discharge valve is opened, a valve in said air supply pipe and means connecting said air valve and said discharge valve for simultaneous operation.

2. In a transport vehicle for pulverized material, a substantially air-tight compartment having an outlet at the bottom, a discharge conduit leading from said outlet, a discharge valve for closing the outlet, said conduit including an elbow and a horizontally extending portion leading therefrom, an air supply pipe entering the compartment having an outlet above the level of pulverized material therein and a second outlet therein adjacent the discharge outlet for material whereby air under pressure is supplied for moving the material downwardly and discharging it through said conduit, a branch pipe connecting said air pipe with an outlet discharging horizontally into said elbow in the direction of movement of material therefrom for further assisting delivery of the material from the compartment, and a valve in said branch pipe coupled with the discharge valve for the outlet, and adapted to be opened and closed simultaneously therewith.

3. In a transport vehicle for pulverized material a substantially air-tight compartment having an outlet at the bottom, a discharge conduit leading from said outlet, a discharge valve for closing the conduit, an air supply pipe opening into the compartment above the level of the pulverized material therein, means for supplying air under pressure through said pipe for assisting in the discharge of material, means for refilling the compartment with other material at will including an intake conduit discharging into the upper portion of the compartment whereby pulverized material may be drawn therethrough by reversing the flow of air in the air supply pipe to produce a partial vacuum in the compartment and an air filter fitting the aforesaid outlet of said air pipe.

4. In a transport vehicle for pulverized material a compartment having an outlet at the bottom, a discharge conduit leading from said outlet, a discharge valve for closing the outlet, said conduit having a portion in which the material moves downwardly, an elbow connected thereto and a portion extending horizontally from the elbow, an air supply pipe discharging horizontally into the elbow in the direction of movement therefrom, means for controlling the discharge valve, and means coupled thereto for actuation simultaneously with said discharge valve and positioned to control the supply of air to said pipe.

5. In a transport vehicle for pulverized material a compartment having an outlet at the bottom, a discharge conduit leading downwardly from said outlet, means for controlling the flow of material through said outlet, and means for discharging air under pressure into the outlet and downwardly therethrough, together with a delivery conduit connected to the outlet and leading horizontally therefrom, with means for discharging air under pressure into the horizontal portion of said conduit in a direction of flow of material therethrough, and valve means controlling the supply of air to said horizontal portion of the conduit and connected to the controlling means for the outlet for actuation simultaneously therewith.

6. In a transport vehicle for pulverized material a substantially air-tight compartment having an outlet at the bottom, a delivery conduit leading from said outlet, a discharge valve for closing the outlet, means for supplying air under pressure to the compartment for moving the material downwardly and discharging it freely through said conduit, together with means for discharging air under pressure into the conduit at a point beyond said outlet and in the direction of flow of material to said conduit, and a valve controlling said air discharge means coupled with the discharge valve for the outlet and thereby adapted to be opened and closed simultaneously therewith.

7. In a transport vehicle for pulverized material a compartment having a delivery outlet at the bottom, a delivery conduit leading from said outlet, a delivery valve for closing the outlet, an air supply pipe having an outlet discharging air under pressure adjacent the outlet for the material and in the direction of delivery for facilitating the flow of said material, and a valve controlling said air supply coupled to the delivery valve to be opened and closed simultaneously therewith.

8. In a transport vehicle for pulverized material a plurality of substantially air-tight bins each having a discharge outlet, and a separate discharge valve for closing each outlet, a common delivery conduit into which all of said outlets lead, means for placing all the compartments simultaneously under air pressure for assisting in discharge of material therefrom, and remote control means for said discharge valves connected thereto and grouped at one location on the vehicle for selectively controlling the discharge valves for emptying in a chosen bin at will.

9. In a transport vehicle for pulverized material a substantially air-tight compartment having two discharge outlets at the bottom with conduits leading therefrom, and valves controlling said conduits respectively, an air supply pipe having an outlet above the level of the pulverized material in the compartment and a second outlet arranged to discharge air adjacent one outlet of the compartment in the direction of outflow of material therethrough, and a second air pipe supported within the compartment and communicating with the first mentioned air supply pipe only by way of the compartment, said second pipe having an opening above the level of pulverized material for receiving air under pressure from the compartment, and an outlet adjacent the other outlet of the compartment for discharging said air under pressure into said other outlet in the direction of outflow of material therethrough.

EUGENE J. DONDLINGER.